United States Patent
Van Riel et al.

(10) Patent No.: US 11,354,420 B2
(45) Date of Patent: Jun. 7, 2022

(54) RE-DUPLICATION OF DE-DUPLICATED ENCRYPTED MEMORY

(71) Applicant: Red Hat, Inc., Raleigh, NC (US)

(72) Inventors: Henri Han Van Riel, Westford, MA (US); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 198 days.

(21) Appl. No.: 15/656,012

(22) Filed: Jul. 21, 2017

(65) Prior Publication Data

US 2019/0026476 A1 Jan. 24, 2019

(51) Int. Cl.
*G06F 21/60* (2013.01)
*G06F 3/06* (2006.01)
(Continued)

(52) U.S. Cl.
CPC ............ *G06F 21/602* (2013.01); *G06F 3/062* (2013.01); *G06F 3/0608* (2013.01);
(Continued)

(58) Field of Classification Search
CPC ...... G06F 21/602; G06F 3/062; G06F 3/0641; G06F 3/0673; G06F 12/0804;
(Continued)

(56) References Cited

U.S. PATENT DOCUMENTS 5,860,094 A * 1/1999 Junya .................. G06F 12/1408
711/5
7,484,073 B2 1/2009 Cohen et al.
(Continued)

FOREIGN PATENT DOCUMENTS

WO 2011078861 6/2011

OTHER PUBLICATIONS

Resma, et al., "A Hybrid Cloud Approach for Secure Authorized Deduplication", http://dsresearchcenter.net/PDF/V2_I15/V2-I15-17.pdf, Sep. 2016; 8 pages.
(Continued)

*Primary Examiner* — Mohammad W Reza
*Assistant Examiner* — Moeen Khan
(74) *Attorney, Agent, or Firm* — Lowenstein Sandler LLP

(57) ABSTRACT

Systems and methods for performing data duplication on data that was previously consolidated (e.g., deduplicated or merged). An example method may comprise: receiving, by a processing device, a request to modify a storage block comprising data encrypted using a location dependent cryptographic input; causing the data of the storage block to be encrypted using a location independent cryptographic input corresponding to a first storage location; copying the data encrypted using the location independent cryptographic input from the first storage location to a second storage location; causing data at the second storage location to be encrypted using a location dependent cryptographic input corresponding to the second storage location; and updating a reference of the storage block from the first storage location to the second storage location.

20 Claims, 7 Drawing Sheets

(51) Int. Cl.
*G06F 12/1009* (2016.01)
*G06F 12/1036* (2016.01)
*G06F 12/0804* (2016.01)
*G06F 21/62* (2013.01)
*G06F 12/14* (2006.01)

(52) U.S. Cl.
CPC .......... *G06F 3/0623* (2013.01); *G06F 3/0641* (2013.01); *G06F 3/0673* (2013.01); *G06F 12/0804* (2013.01); *G06F 12/1009* (2013.01); *G06F 12/1036* (2013.01); *G06F 21/6218* (2013.01); *G06F 12/1408* (2013.01); *G06F 2212/1044* (2013.01); *G06F 2212/1052* (2013.01); *G06F 2212/68* (2013.01)

(58) Field of Classification Search
CPC ............. G06F 12/1009; G06F 12/1036; G06F 21/6218; G06F 2212/1044; G06F 2212/68
USPC ....................................................... 713/193
See application file for complete search history.

(56) References Cited

U.S. PATENT DOCUMENTS

| | | | |
|---|---|---|---|
| 7,620,766 | B1 | 11/2009 | Waldspurger |
| 8,165,221 | B2 | 4/2012 | Zheng et al. |
| 8,495,318 | B2 | 7/2013 | Tremaine et al. |
| 8,607,013 | B2 | 12/2013 | Chen et al. |
| 8,627,112 | B2 | 1/2014 | Chaturvedi et al. |
| 8,713,328 | B2 | 4/2014 | Ikeuchi et al. |
| 8,719,545 | B2 | 5/2014 | Pandey et al. |
| 8,776,059 | B2 | 7/2014 | Reumann et al. |
| 8,832,390 | B1 | 9/2014 | Ahmad et al. |
| 9,021,476 | B1* | 4/2015 | Pratt ................... G06F 9/45558 718/1 |
| 9,042,386 | B2 | 5/2015 | Lynar et al. |
| 9,069,477 | B1* | 6/2015 | Overton ............... G06F 12/109 |
| 9,116,849 | B2 | 8/2015 | Nayshtut et al. |
| 9,170,950 | B2 | 10/2015 | Dube et al. |
| 9,361,145 | B1 | 6/2016 | Wilson et al. |
| 9,536,111 | B2* | 1/2017 | Sibert ................... G06F 12/145 |
| 9,563,569 | B2 | 2/2017 | Tsirkin |
| 9,720,717 | B2 | 8/2017 | Carson et al. |
| 9,729,524 | B1 | 8/2017 | Brandwine et al. |
| 9,773,118 | B1 | 9/2017 | Bennett et al. |
| 9,940,377 | B1 | 4/2018 | Sait |
| 10,379,764 | B2 | 8/2019 | Tsirkin et al. |
| 2008/0072072 | A1* | 3/2008 | Muraki ............ G11B 20/00086 713/193 |
| 2010/0095046 | A1* | 4/2010 | Reid ................... G06F 12/0246 711/102 |
| 2010/0250502 | A1 | 9/2010 | Saigo |
| 2012/0030406 | A1 | 2/2012 | Chang et al. |
| 2012/0110328 | A1 | 5/2012 | Pate et al. |
| 2012/0144209 | A1 | 6/2012 | Kahler et al. |
| 2012/0216052 | A1 | 8/2012 | Dunn |
| 2012/0311327 | A1 | 12/2012 | Liu et al. |
| 2012/0324239 | A1 | 12/2012 | Falk et al. |
| 2013/0097296 | A1 | 4/2013 | Gehrmann et al. |
| 2013/0114812 | A1* | 5/2013 | Gidwani ................... H04L 9/08 380/255 |
| 2013/0145177 | A1* | 6/2013 | Cordelia ................. G06F 21/85 713/193 |
| 2014/0157005 | A1 | 6/2014 | Leventhal et al. |
| 2014/0208111 | A1 | 7/2014 | Brandwine et al. |
| 2014/0258655 | A1 | 9/2014 | Park et al. |
| 2014/0337637 | A1* | 11/2014 | Kiperberg ............... G06F 21/14 713/189 |
| 2015/0046927 | A1 | 2/2015 | Rodbro et al. |
| 2015/0100791 | A1 | 4/2015 | Chen et al. |
| 2015/0193248 | A1 | 7/2015 | Noel et al. |
| 2015/0242159 | A1 | 8/2015 | Tsirkin |
| 2015/0248357 | A1* | 9/2015 | Kaplan ............... G06F 12/1408 713/193 |
| 2015/0318986 | A1 | 11/2015 | Novak et al. |
| 2015/0381589 | A1 | 12/2015 | Tarasuk-Levin et al. |
| 2016/0026489 | A1 | 1/2016 | Maislos et al. |
| 2016/0034296 | A1 | 2/2016 | Kedem et al. |
| 2016/0092678 | A1 | 3/2016 | Probert et al. |
| 2016/0092702 | A1 | 3/2016 | Durham et al. |
| 2016/0266923 | A1 | 9/2016 | Miyoshi |
| 2016/0342462 | A1 | 11/2016 | Karamanolis et al. |
| 2016/0378522 | A1 | 12/2016 | Kaplan et al. |
| 2016/0378688 | A1 | 12/2016 | Rozas et al. |
| 2017/0003882 | A1 | 1/2017 | Bartik et al. |
| 2017/0032119 | A1 | 2/2017 | Dore et al. |
| 2017/0177441 | A1 | 6/2017 | Chow |
| 2017/0177862 | A1* | 6/2017 | Narendra Trivedi ....................... G06F 3/0604 |
| 2017/0206175 | A1 | 7/2017 | Sliwa et al. |
| 2017/0262204 | A1 | 9/2017 | Dornemann et al. |
| 2017/0277898 | A1* | 9/2017 | Powell ................. G06F 21/602 |
| 2017/0299712 | A1 | 10/2017 | Scott et al. |
| 2017/0357592 | A1 | 12/2017 | Tarasuk-Levin et al. |
| 2017/0364707 | A1* | 12/2017 | Lal .......................... G06F 13/28 |
| 2018/0011802 | A1* | 1/2018 | Ndu .......................... G09C 1/00 |
| 2018/0032447 | A1 | 2/2018 | Kaplan et al. |
| 2018/0060237 | A1 | 3/2018 | Leslie-Hurd et al. |
| 2018/0089468 | A1 | 3/2018 | Rozas et al. |
| 2018/0189193 | A1 | 7/2018 | Bernat et al. |
| 2018/0191491 | A1 | 7/2018 | Chhabra et al. |
| 2018/0247082 | A1 | 8/2018 | Durham et al. |
| 2018/0307435 | A1 | 10/2018 | van Riel et al. |
| 2019/0057222 | A1* | 2/2019 | Bradley ................. G06F 21/60 |

OTHER PUBLICATIONS

Nirmalrani V et al., "Efficient Method for Cloud Storage Based on Proof of Ownership", http://www.ijptonline.com/wp-content/uploads/2016/07/3815-3822.pdf, Jun. 2016; 8 pages.

Tang, et al., "Enabling Ciphertext Deduplication for Secure Cloud Storage and Access Control", http://dl.acm.org/citation.cfm?id=2897846. May 30-Jun. 3, 2016, 2 pages.

Train2brain, "A Hybrid Cloud Approach for Secure Authorized Reduplication", http://www.train2brain.com/courses/a-hybrid-cloud-approach-for-secure-authorized-reduplication/, 2 pages.

Divyambika, et al., "Protection of Virtual Machines during Live Migration in Cloud Environment", School of Computing, SASTRA University, Thanjavur—613401, Tamil Nadu, India, May 2015, http://www.indjst.org/index.php/indjst/article/viewFile/65589/55379, 7 pages.

Aiash, et al., "Secure Live Virtual Machines Migration: Issues and Solutions", School of Science and Technology Middlesex University, UK, May 2014, https://www.researchgate.netpublication/260763074_Secure_Live_Virtual_Machines_Migration_Issues_and_Solutions, 10 pages.

Steele, "Virtual Machine Migration FAQ: Live Migration, P2V and More", Aug. 2010, http://searchservervirtualization.techtarget.com/feature/Virtual-machine-migration-FAQ-Live-migration-P2V-and-more, 4 pages.

Mashtizadeh, et al., "XvMotion: Unified Virtual Machine Migration over Long Distance", Stanford University; VMware, Inc., Jun. 19-20, 2014, 13 pages.

Kaplan, et al., "AMO Memory Encryption", Advanced Micro Devices, Inc., Apr. 21, 2016, 12 pages.

Secure Encrypted Virtualization Key Management, Advanced Micro Devices, publication No. 55766, Aug. 2016, 68 pages.

Jo, Changyeon et al., "Efficient Live Migration of Virtual Machines Using Shared Storage", 2013, pp. 1-10.

* cited by examiner

RE-DUPLICATION OF DE-DUPLICATED ENCRYPTED MEMORY

TECHNICAL FIELD

The present disclosure is generally related to data storage management, and more particularly, to duplicating encrypted data that was previously deduplicated (e.g., merged, consolidated) to reduce storage space.

BACKGROUND

Modern computer systems perform data deduplication to improve the utilization of data storage resources. Data duplication is a technique that removes duplicate copies of repeating data to enable more data to be stored within a data storage device. The technique of data duplication may involve identifying unique chunks or byte patterns of data that are stored within a data storage resource. The unique chunks are compared to other chunks stored within the data storage resource and when a match occurs, redundant chunks are replaced with a small reference that points to one of the stored chunks. Given that the same chunk or byte pattern may occur dozens, hundreds, or even thousands of times, the amount of data that should be stored or transferred can be greatly reduced. When subsequent requests are made to alter the chunk of data the chunk may be re-duplicated so that the alteration can be applied to the re-duplicated chunk.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
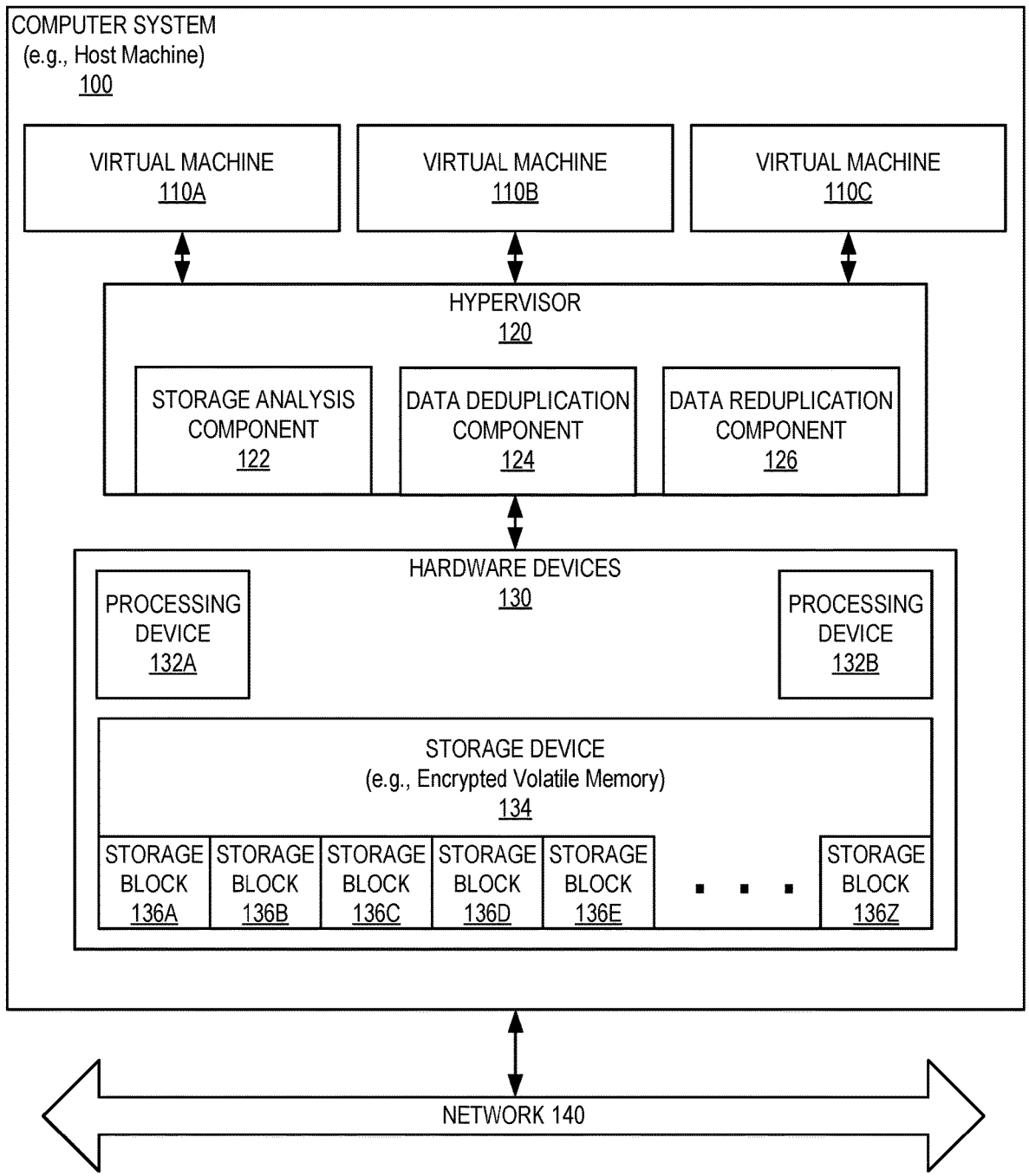
FIG. 1 depicts a high-level block diagram of an example computer system architecture that performs deduplication and reduplication of data while the data remains in an encrypted form in the storage device, in accordance with one or more aspects of the present disclosure.

Computer systems often use cryptographic functions to encrypt data stored within a data storage device. The cryptographic functions frequently use variations in cryptographic input to enhance security and cause multiple instances of identical content to appear different once encrypted. Some cryptographic systems provide this variation by performing the encryption at a hardware level using a cryptographic key that is based on hardware embedded information of the data storage device (e.g., physical storage address). In a virtualized computer system, the hardware level encryption may encrypt storage of a virtual machine so that it is accessible by the virtual machine but inaccessible by the hypervisor or host operating system managing the virtual machine. This may enhance security but may cause the storage of a virtual machine to become inaccessible when moved by the hypervisor. This may be problematic because the hypervisor may be responsible for performing data deduplication and subsequent reduplication to optimize the use of storage devices storing virtual machine data. In the past, the storage may not have been encrypted or the hypervisor may be able to decrypt the data when it was encrypted, but providing the hypervisor with access to data of the virtual machine in an unencrypted form may present security vulnerabilities.

Aspects of the present disclosure address the above and other deficiencies by providing technology to perform deduplication and reduplication of encrypted data without accessing the data in an unencrypted form. In one example, executable code of a kernel or other module may receive a request to modify a storage block with data that is encrypted using a location dependent cryptographic input. The kernel may cause the encrypted data within the storage block to be converted from a location dependent encryption to a location independent encryption that uses location independent cryptographic input. The location dependent cryptographic input may include a cryptographic bit sequence that is associated with or based on a particular location of the data, such as the location of a storage block containing the data. Location independent cryptographic input may be similar to location dependent cryptographic input but may not correspond to a particular location. Location independent cryptographic input may function the same or similar to a transport key or migration key that enables a storage block to be transported between storage block locations in an encrypted form without becoming inaccessible.

The kernel may convert the data from a location dependent encryption to a location independent encryption by instructing underlying hardware to prepare the data to be migrated to another machine without intending for the data to be migrated to the other machine (e.g., pseudo-migration). The kernel may then copy the data that has been encrypted using location independent cryptographic input from a first storage location to a second storage location. The first and second storage locations may be within the same storage device or within different storage devices. Once the data is at the second storage location, the kernel may cause the data to be converted from the location independent encryption (e.g., prepared for migration) back to a location dependent encryption that is based on the new location. At any point during this process, the kernel may update a reference of the storage block that pointed to the first storage location to now point to the second storage location. This may enable the kernel to process the modification request on data at the second location that is modifiable as opposed to data at the first location, which may remain non-modifiable.

The systems and methods described herein include technology that enables data deduplication and reduplication in a security enhanced computing environment. In particular, aspects of the present disclosure may enable a kernel or other executable module to perform data reduplication on encrypted storage blocks. This may enhance the storage utilization and security of a computing system because the deduplication and reduplication may be performed while the data is in an encrypted form and the content of the data may remain concealed from storage management functions performing the deduplication or reduplication. Aspects of the present disclosure may be performed on volatile data storage or non-volatile data storage and may enhance a computer system's ability to optimize memory resources, hard disk resources, solid-state storage resources, other storage resources, or a combination thereof.

Various aspects of the above referenced methods and systems are described in details herein below by way of examples, rather than by way of limitation. The examples provided below discuss a virtualized computer system where the data deduplication may be performed by aspects of a hypervisor, a host operating system, a virtual machine, or a combination thereof. In other examples, the data deduplication or reduplication may be performed in a non-virtualized computer system that is absent a hypervisor or other virtualization or emulation features discussed below.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted.

Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machines 110A-C, a hypervisor 120, hardware devices 130, and a network 140.

Virtual machines 110A-C may execute guest executable code that uses an underlying emulation of physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc.

Hypervisor 120 may also be known as a virtual machine monitor (VMM) and may provide virtual machines 110A-C with access to one or more features of the underlying hardware. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a storage analysis component 122, a data deduplication component 124, and a data reduplication component 126. Components 122, 124, and 126 may each be separated into one or more components or may be included within the same component.

Storage analysis component 122 may analyze a storage device 134 to identify portions of storage device 134 that can be deduplicated or content that has already been deduplicated and may be reduplicated to enable modification. Storage analysis component 122 may analyze aspects (e.g., time, location) of one or more storage blocks and may select multiple storage blocks that are likely to include the same or similar content. Storage analysis component 122 may then prepare the content of the selected storage blocks by initiating the computer system 100 to encrypt or decrypt the storage blocks with location dependent or location independent cryptographic input.

Data deduplication component 124 may compare the storage blocks and subsequently consolidate or merge duplicate content. Data deduplication component 124 may compare the encrypted storage blocks by comparing the cipher text of each of the selected storage blocks. When the storage blocks contain the same or similar cipher text, the data deduplication component 124 may infer that the underlying unencrypted content is duplicative. Data deduplication component 124 may then update the storage device to remove the duplicate content and reconfigure references that point to the duplicate content to subsequently point to a single copy of the content.

Data reduplication component 126 may enable data that was deduplicated to be subsequently reduplicated so that it can be modified. When data is deduplicated it may be consolidated into one or more storage blocks that are read-only and data reduplication component may separate the data to enable the storage blocks to be modified independent of one another. The features of storage analysis component 122, data deduplication component 124, and data reduplication component 126 are discussed in more detail below in regards to FIG. 2.

Hardware devices 110 may provide hardware functionality for performing computing tasks. Hardware devices 130 may include one or more processing devices 132A, 132B, one or more storage devices 134, other computing devices, or a combination thereof. One or more of hardware devices 110 may be split up into multiple separate devices or consolidated into one or more hardware devices. Some of the hardware device shown may be absent from hardware devices 130 and may instead be partially or completely emulated by executable code.

Processing devices 132A and 132B may include one or more processors that are capable of executing the computing tasks discussed above in regards to components 122, 124 and 126. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs a cryptographic transformation (e.g., encryption or decryption) of data within storage device 134.

Storage device 134 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage device 134 may include one or more registers (e.g., processor registers) or memory devices (e.g., main memory). In another example, storage device 134 may include one or more mass storage devices, such as hard drives, solid-state storage (e.g., solid state drives (SSD)), other data storage devices, or a combination thereof. In a further example, storage device 134 may include a combination of one or more registers, one or more memory devices, one or more mass storage devices, other data storage devices, or a combination thereof, which may be arranged in a cache hierarchy. Storage device 134 may store data within one or more storage blocks 136A-Z.

Storage blocks 136A-Z may be any physical data storage or logical data storage for storing, organizing, or accessing data. A storage block may include a contiguous or non-contiguous sequence of bytes or bits. A storage block may have a block size which may be the same or different from a physical block size of the underlying hardware. The block size may be a fixed-size, such as a particular integer value (e.g., 4 KB) or may be a variable-size that varies within a range of integer values. Each of the storage blocks 136A-Z may have the same block size or a different block size to an adjacent block. In one example, storage blocks 136A-Z may be memory blocks and each memory block may correspond to an individual memory page, multiple memory pages, or a portion of a memory page. In another example, each of the storage blocks 136A-Z may correspond to a portion (e.g., sector) of a mass storage device (e.g., hard disk) or other storage device.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
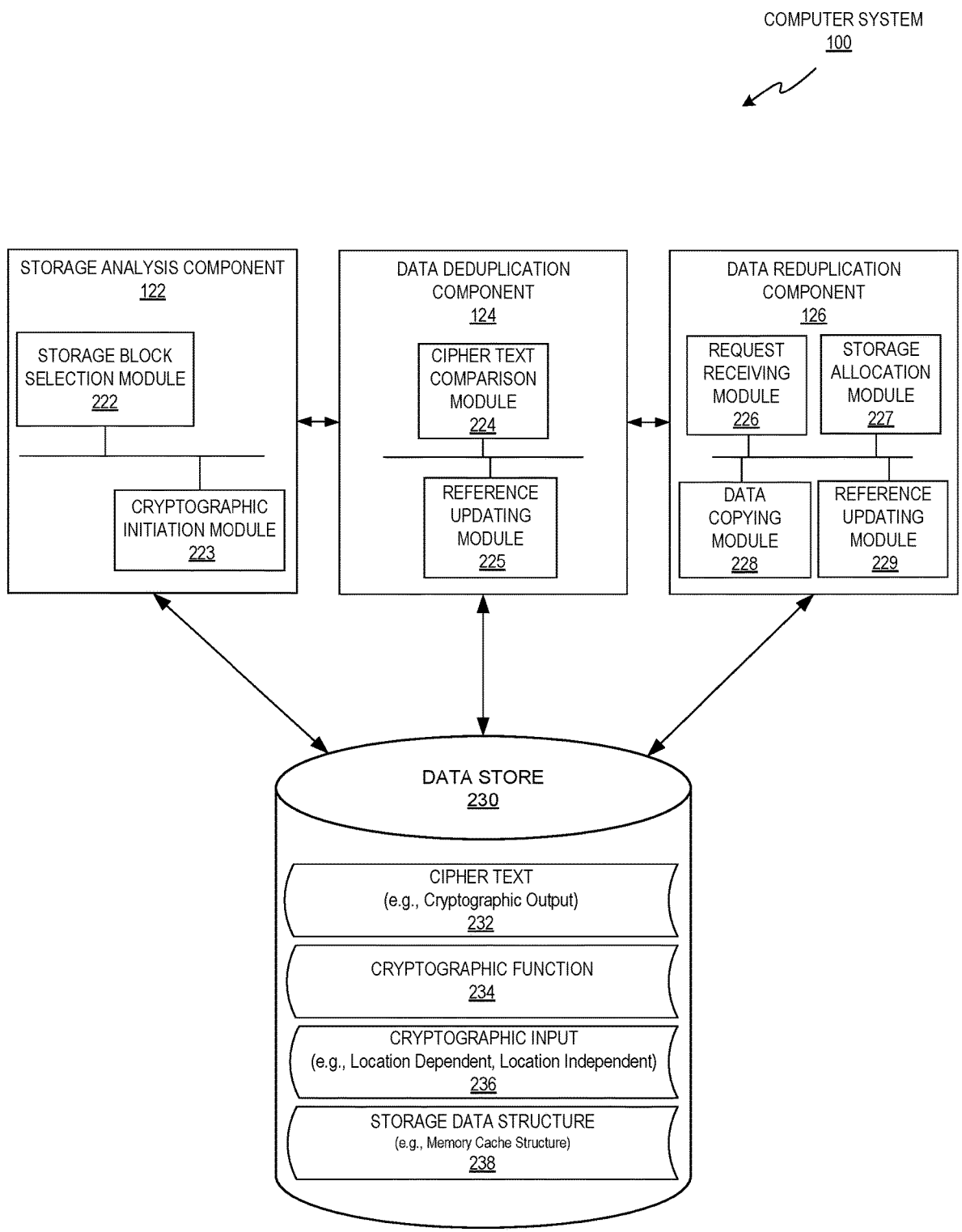
FIG. 2 depicts a block diagram illustrating components and modules of an example computer system, in accordance with one or more aspects of the present disclosure.

FIG. 2 is a block diagram illustrating example components and modules of computer system 100, in accordance with one or more aspects of the present disclosure. In the example shown, computer system 100 may include a storage analysis component 122, a data deduplication component 124, and a data reduplication component 126.

Storage analysis component 122 may enable computer system 100 to analyze one or more storage devices to identify portions of the storage devices that may contain duplicate content and to prepare the content for comparison. In one example, storage analysis component 122 may include a storage block selection module 222 and a cryptographic initiation module 223.

Storage block selection module 222 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage blocks. The spatial data may be any data that relates to the location of one or more storage blocks with respect to the storage device. The locations may be a particular location (e.g., address) or a relative location (e.g., adjacent to) and may include logical locations (e.g., virtual address or address range) or physical locations (e.g., physical address or address range) of the storage block. The contextual data may be any data that provides a context of a storage block or content within the storage block and may indicate a particular thread, process, user, host, virtual machine, or a combination thereof.

The temporal data, spatial data, or contextual data associated with the storage blocks may be analyzed and or weighted to calculate a similarity score. The similarity score may be a probabilistic value that indicates the probability that separate storage blocks or groups of storage blocks include the same or similar content data. The probabilistic value may be represented in any form such as decimals, fractions, percentages, ratios, other forms, or combination thereof. Storage block selection module 222 may select one or more storage blocks in view of the similarity score. For example, storage block selection module 222 may select one or more storage blocks that satisfy (e.g., above or below) a predetermined threshold. Storage block selection module 222 may identify particular storage blocks or groups of storage blocks and may pass these storage blocks to cryptographic initiation module 223.

Cryptographic initiation module 223 may process the one or more storage blocks so that the storage blocks can be compared to identify duplicate data. As discussed above, the storage blocks may be encrypted using different cryptographic input and this may cause the same content data to be presented as different cipher text, which may make the detection of duplicate data challenging. Cryptographic initiation module 223 may cause multiple storage blocks to be encrypted using the same cryptographic function and cryptographic input (e.g., cryptographic key) so that similar content data is represented with similar cipher text 232.

Cipher text 232 may be any form of encrypted data and need not be able to be represented in a textual format. Cipher text may be represented as binary data, textual data, image data, other data, or a combination thereof. Cipher text may be the result of encrypting unencrypted content (e.g., plaintext) or further encrypting previously encrypted content. Cipher text 232 may be the output of cryptographic function 234.

Cryptographic function 234 may be any function that is suitable for use in a standardized or proprietary cryptographic protocol and may involve one or more mathematical manipulations of content data. Cryptographic function 234 may map data of an arbitrary size to a bit sequence of a fixed size or variable size. In one example, cryptographic function 234 may be a cryptographic hash function that takes a content message as input and outputs a hash value, which may be referred to as cipher text, a digest, or a message digest. Cryptographic function 234 may include a private key cryptographic function, a public key cryptographic function, other cryptographic function, or a combination thereof. In one example, cryptographic function 234 may be an "in-place" cryptographic function or include similar functionality that avoids copying the first storage block to another location during the execution of the cryptographic function (e.g., during encryption or decryption).

An in-place cryptographic function may transform data within a storage block without using auxiliary data storage internal or external to the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data. In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be less than, greater than, or equal to $O(\log n)$, $O(n)$, or other portion of "n," wherein "n" is the number of bits or bytes of the unencrypted content data.

Cryptographic input 236 may include any data that is used by cryptographic function 234 to encrypt or decrypt content data. Cryptographic input 236 may be any cryptographic bit sequence including encryption keys, decryption keys, public keys, private keys, symmetric keys, asymmetric keys, other cryptographic data, or a combination thereof. Cryptographic input 236 may include or be generated or derived from one or more initialization vectors, starting variables, other data, or a combination thereof. Cryptographic input 236 may include or be based on the spatial data, temporal data, or contextual data discussed above. In one example, cryptographic input 236 may include location dependent cryptographic input or location independent cryptographic input, or a combination thereof.

Location dependent cryptographic input may include a cryptographic bit sequence that is associated with or based on a location of data, such as the location of a storage block containing the data. The location of the storage block may be based on hardware embedded information of a processing device, a storage device, a machine (physical or virtual machine), or other information associated with a storage block. In one example, location dependent cryptographic input may be based on location information (e.g., spatial data) that corresponds to the storage block. The location information may be relative to a particular storage device, such as a physical address, a logical address, other address, or a combination thereof. In other examples, location dependent cryptographic input may also or alternatively be based on other location information such as information of the storage device containing the storage block or information about a processing device, interface, port, adapter, or other device for accessing the storage block. The location information may be based on data that is permanently or temporarily associated with (e.g., assigned to or embedded within) a hardware device. In one example, this may cause each particular storage block to be associated with different location dependent cryptographic inputs that are based on the location of the particular storage block. This may be advantageous because it may provide enhanced security protection but may cause content encrypted with a location based input to become inaccessible when moved to a different storage block.

Location independent cryptographic input may be similar to location dependent cryptographic input but may not correspond to a particular location. Location independent cryptographic input may function the same or similar to a transport key or migration key that enables a storage block to be transported between storage block locations in an encrypted form without becoming inaccessible. Location independent cryptographic input may be used to create or derive one or more cryptographic keys to encrypt content of one or more storage blocks and to decrypt the content after it is moved to other locations. In one example, the location independent cryptographic input may be a cryptographic key or a pair of cryptographic keys that can be used to perform the encryption and subsequent decryption. In another example, the location independent cryptographic input may be used to generate (e.g., mathematically derive) one or more encryption keys and one or more decryption keys.

Location independent cryptographic input may be based on information provided by a computing process that causes the encryption or decryption (e.g., hypervisor process). The information provided may be generated by a computing process that is initiating the transformation or by another computing process. The information provided may be randomly generated for temporary use, such as for a migration or copy operation. The duration of the temporary use may be based on a duration of a particular migration, a duration of the computing process, other duration, or a combination thereof.

Cryptographic initiation module 223 may prepare the content of the selected storage blocks for a subsequent comparison by initiating the computer system 100 to encrypt the one or more storage blocks using the same cryptographic function 234 and the same cryptographic input (e.g., a common key). In one example, the underlying hardware may execute the cryptographic function 234 without providing a higher-level executable code (e.g., kernel of hypervisor or host operating system) access to the cryptographic function, cryptographic input, unencrypted content, or a combination thereof. In another example, the cryptographic function may be executed by the kernel of the hypervisor or host operating system in combination with hardware and lower-level code (e.g., firmware). The kernel of the hypervisor or host operating system may execute the cryptographic function 234 without providing a higher-level executable code (e.g., application or kernel of guest operating system) access to the cryptographic function, cryptographic input, unencrypted content, or a combination thereof. In either scenario, the portion of the higher-level code executing the data deduplication or reduplication may not be capable of unencrypting the storage blocks because it may be exclusively performed by lower level executable code and/or hardware. This may be advantageous because reducing access to the cryptographic keys and unencrypted data may enhance security.

Cryptographic initiation module 223 may cause computer system 100 to encrypt the storage blocks with location independent cryptographic input by initiating a migration of the encrypted data. As discussed above, the data may be encrypted using a cryptographic key that is linked to the hardware and therefore may be inaccessible if the encrypted content were copied to another machine with different hardware. For example, if the data is encrypted using a hardware specific cryptographic key then the new machine may be incapable of using its hardware specific cryptographic key to decrypt the content. Many hardware systems address this by including support (e.g., hardware instructions) for a migration procedure that decrypts and re-encrypts the data using location independent cryptographic input (e.g., transport key, migration key, common key). The location independent cryptographic input may include one or more cryptographic keys that enable data to be transported (e.g., moved, migrated, or copied) to another machine while in an encrypted form.

The location independent cryptographic input may be generated based on a cryptographic bit sequence provided by the higher-level executable code before, during, or after initiating the migration or may be generated by lower-level executable code before, during, or after initiating the migration. In either situation, the cryptographic bit sequence used to generate the location independent cryptographic input may be accessed and interpreted by the higher-level executable code (e.g., code performing data deduplication or reduplication) and may be provided to hardware at a new location (e.g., migration target). In one example, cryptographic initiation module 223 may initiate underlying support for the migration of the encrypted content without an intent to actually migrate the encrypted data. Instead, cryptographic initiation module 223 may use the migration functionality to cause the encrypted data to be encrypted using the location independent cryptographic input. This may enable data deduplication component 124 to detect and remove duplicate data or for data reduplication component 126 to copy the data to a new location for subsequent modification.

Data deduplication component 124 may determine whether the content of multiple encrypted storage blocks include duplicate data and may remove some or all of the duplicate content. When comparing the content data of a storage block, not all of the data may need to be compared because some of the data within a storage block may be extraneous data (e.g., padding or unoccupied). Therefore, storage blocks with similar but not identical content may still be determined to be duplicates because they contain at least some identical content. In the example shown in FIG. 2, data deduplication component 124 may include a cipher text comparison module 224 and a reference updating module 225.

Cipher text comparison module 224 may enable computer system 100 to compare the encrypted content (e.g., cipher text) of different storage blocks to determine whether the storage blocks contain duplicate unencrypted content. The comparison may be performed with access to only the encrypted content (cipher text, digest) and without access to the unencrypted content (e.g., plain text, message). In one example, cipher text comparison module 224 may directly compare the cipher text of a storage block with the cipher text of one or more other storage blocks. In another example, cipher text comparison module 224 may indirectly compare multiple storage blocks by comparing data representative of the cipher text such as a hash of the cipher text or one or more other portions of the cipher text or data associated with the cipher text.

Reference updating module 225 may update a storage data structure 238 to remove one or more duplicate storage blocks. Storage data structure 238 may include one or more references that correspond to one or more storage blocks. Each reference may identify (e.g., point to) the beginning, middle, end, or other portion of the one or more storage blocks. When a first storage block and a second storage block are determined to be duplicates, reference updating module 225 may update the storage data structure 238 to change a reference to the first storage block to subsequently reference the second storage block. As a result, the references for the first storage block and the second storage block may point to the identical storage block (i.e., second storage block). This may effectively remove the first block by de-referencing the first storage block so that it can be subsequently reused, reallocated, flushed, wiped, or other action.

Storage data structure 238 may be a memory cache data structure or it may be another storage data structure that corresponds to a caching system, a file system, a database system, other storage system, or a combination thereof. In one example, storage data structure 238 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After detecting duplicates, reference updating module 225 may update the memory cache data structure by invalidating the pointer entries for one or more of the duplicate storage blocks and may flush the address-translation cache to remove references to or the content of the duplicates.

Data reduplication component 126 may enable data that was deduplicated to be reduplicated for subsequent modification. When data is deduplicated it may be consolidated into one or more storage blocks that are read-only and data reduplication component 126 may duplicate the data to enable the storage blocks to be modified independent of one another. In the example shown in FIG. 2, data reduplication component 126 may include a request receiving module 226, a storage allocation module 227, a data copying module 228, and a reference updating module 229.

Request receiving module 226 may receive a request to modify a storage block that was consolidated during a de-duplication process. The request may include storage block identification data, modification data, other data, or a combination thereof. The storage block identification data may be used to determine one or more storage blocks and may include one or more references or storage locations. The modification data may identify an operation or instruction for modifying the data. The request may be received by a kernel (e.g., host operating system, hypervisor) from upper-level executable code (e.g., virtual machine). In one example, the kernel may be a hypervisor and the hypervisor may receive the request from a guest operating system or guest application executing on the virtual machine. In another example, the kernel may be a part of a host operating system and the request may originate from the hypervisor or virtual machine. In other examples, the kernel may provide operating system level virtualization (e.g., container platform) and may receive the request from a container managed by an operating system level virtualization layer.

Storage allocation module 227 may allocate data storage to store a copy of the encrypted data. The encrypted data may be stored at a first storage location and storage allocation module 227 may allocate storage at a second storage location. The first and second storage locations may be logical locations or physical locations that are on the same storage device or on different storage devices. In one example, the first storage location may be associated with a first memory block (e.g., first memory page) and the second storage location may be associated with a second memory block (e.g., second memory page). The first and second memory blocks may be on the same or different memory devices. The different memory devices may be memory devices that were or were not manufactured separately and may be associated with the same caching level (e.g., main memory) of a cache hierarchy.

Data copying module 228 may update one or more storage devices by copying the data encrypted with the location independent cryptographic input to the newly allocated or previously existing second storage location. Copying data of a storage block between storage locations may involve copying digital content of the entire storage block or just a portion of the storage block. The copying may be performed without exposing the digital content in an unencrypted form to the kernel performing the copy (e.g., hypervisor or host operating system). In one example, the content may be copied while it is in an encrypted form (e.g., location independent encryption). In other examples, the content may be copied while the content is in an unencrypted form but it may be performed at a hardware level so that the content remains hidden (e.g., concealed, unexposed, secret, inaccessible, unavailable) from a kernel that causes or initiates the copying.

Data copying module 228 may interact with cryptographic initiation module 223 to cause the data encryption to be converted from a location dependent encryption to a location independent encryption. Data copying module 228 may identify one or more storage blocks and use features of cryptographic initiation module 223. Copying a storage block may involve copying digital content of one or more storage blocks to a new location and may involve a copy operation, a migrate operation, a move operation, other operation, or a combination thereof. In one example, the copy may involve physically manipulating the bits at the new location. In another example, the copying may involve an operation that manipulates one or more pointers without physically manipulating the bits of the storage block at the original or new locations. For example, that may involve re-referencing a storage block that was previously dereferenced. In yet another example, the copying or subsequent steps of the migration may involve a combination of manipulating physical bits and references to the physical bits. The references (e.g., pointers) may be stored in storage data structure 238.

Reference updating module 229 may be the same or similar to reference updating module 225 but may perform tasks to reduplicate, as opposed to deduplicate storage blocks. Reference updating module 229 may update storage data structure 238 to update a reference that points to the original storage block to subsequently point to the new storage block. This may be advantageous because the original storage block may comprise read-only data (e.g., deduplicated data) and the new storage block may comprise data that is modifiable (e.g., reduplicated data). When the storage blocks are portions of memory (e.g., memory pages), reference updating module 229 may update multiple separate storage data structures corresponding to the virtual machine, hypervisor, or host operating system. For example, there may be a first storage data structure that corresponds to the host memory and may be maintained by the hypervisor and there may be a second storage data structure that corresponds to guest memory of the virtual machine and may be maintained by the virtual machine. The host memory may correspond to physical memory (e.g., main memory) of the host and the guest memory may correspond to what appears to the virtual machine as its portion of physical memory (e.g., guest physical memory).

Figure 3:
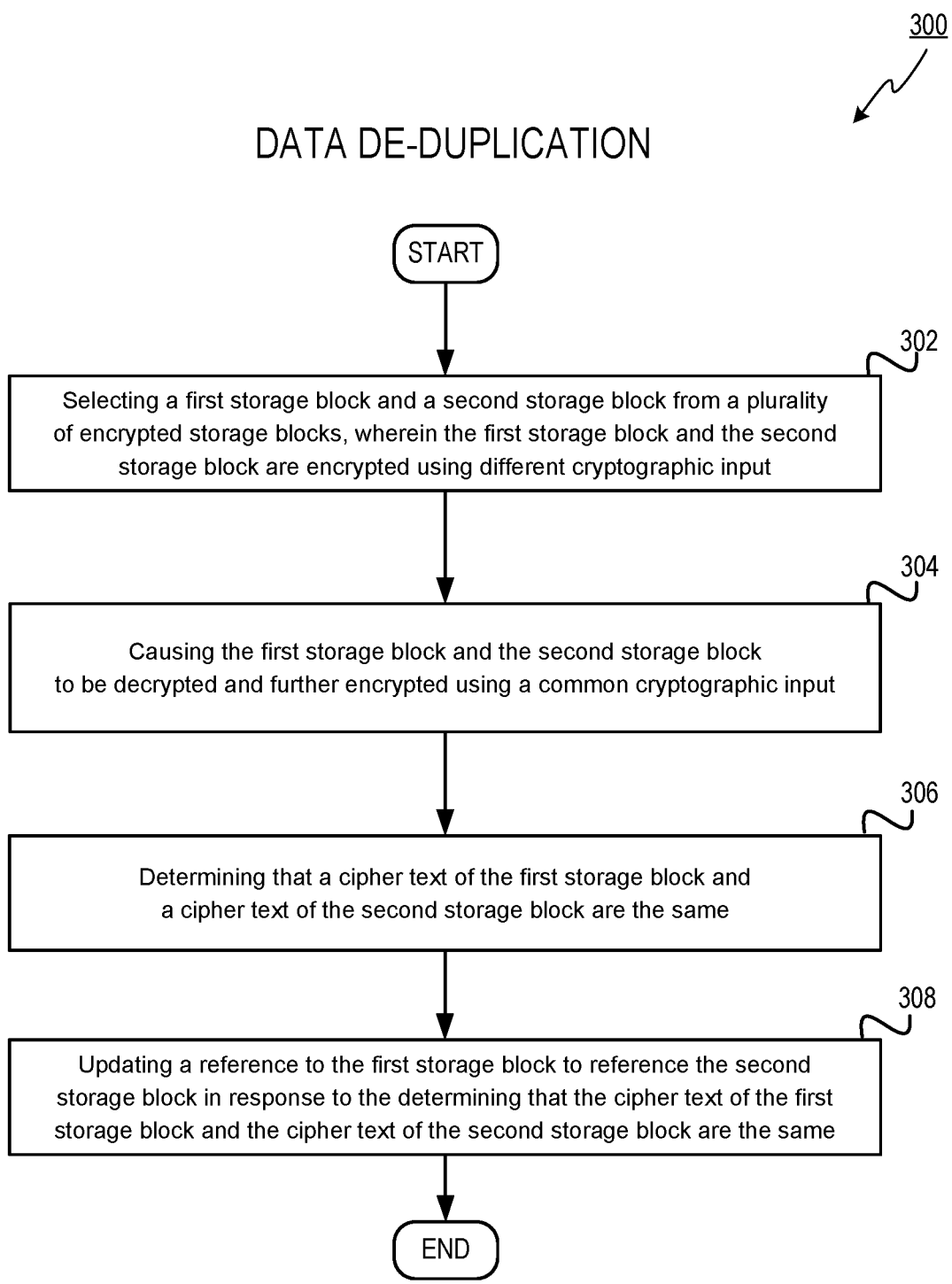
FIG. 3 depicts a flow diagram of an example method for performing data deduplication on encrypted data, in accordance with one or more aspects of the present disclosure.
Figure 4:
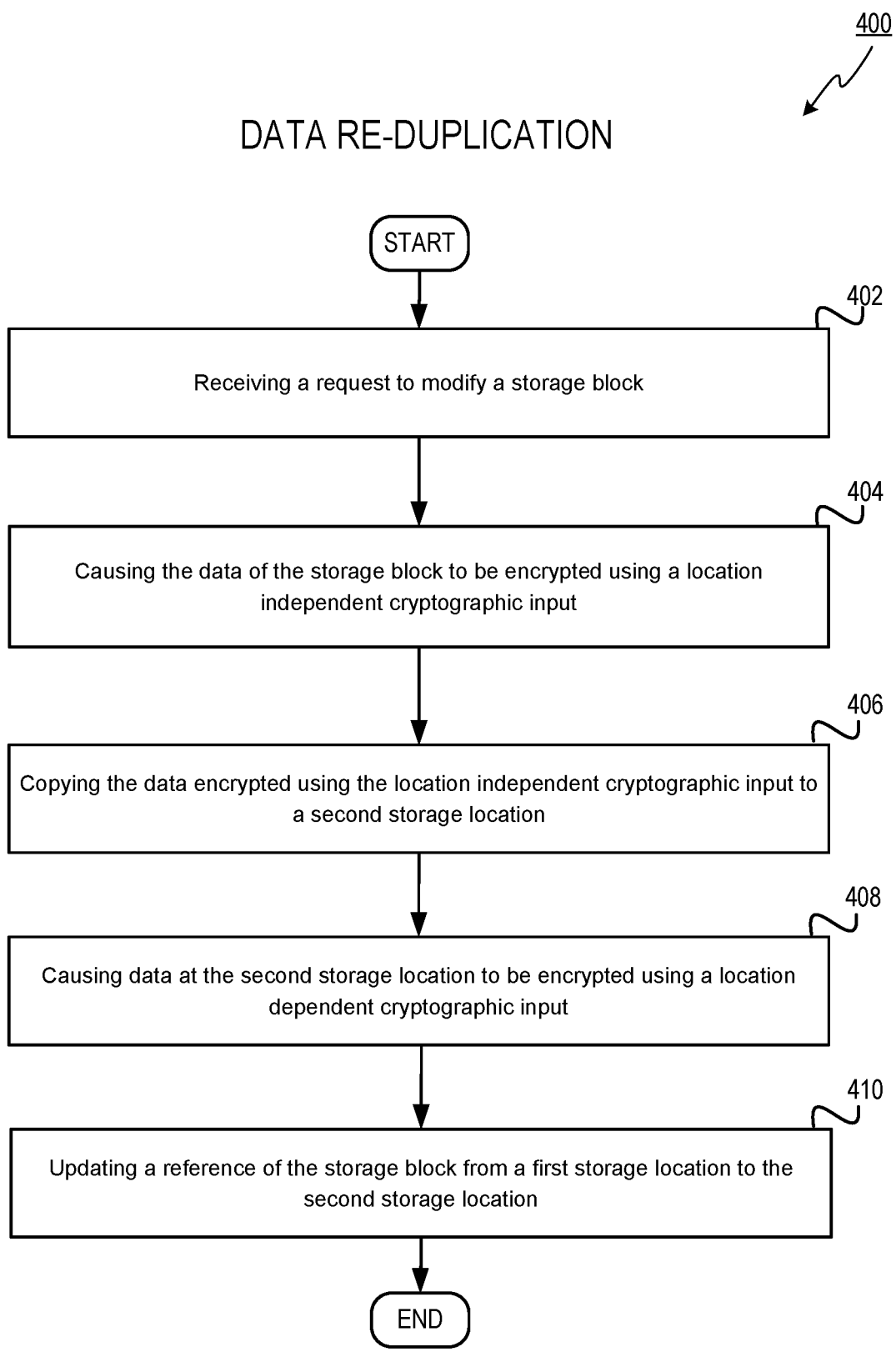
FIG. 4 depicts a flow diagram of an example method for performing data reduplication on encrypted data, in accordance with one or more aspects of the present disclosure.

FIGS. 3 and 4 depict flow diagrams for illustrative examples of methods 300 and 400 for performing data deduplication technology in accordance with aspects of the disclosure. Method 300 illustrates an example process flow for performing data deduplication to reduce the amount of duplicate data in a storage device and method 400 is an example process flow for performing data reduplication to enable the modification of previously deduplicated data. Methods 300 and 400 may be performed by processing devices that may comprise hardware (e.g., circuitry, dedicated logic, programmable logic, microcode, etc.), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by a kernel of a hypervisor as shown in FIG. 1 or by an executable code of a host machine (e.g., host operating system or firmware), a virtual machine (e.g., guest operating system or firmware), other executable code, or a combination thereof.

Referring to FIG. 3, method 300 may be performed by processing devices of a server device or a client device and may begin at block 302. At block 302, the processing device may select a first storage block and a second storage block from a plurality of encrypted storage blocks, wherein the first storage block and the second storage block are encrypted using different cryptographic input. In one example, the first storage block and the second storage block may be selected from the plurality of encrypted storage blocks in view of a heuristic that uses modification times of the first and second storage blocks. The first storage block and the second storage block may exist in a volatile data storage device (e.g., main memory) and may each be encrypted using a key that is based on a physical address of the respective storage block. In one example, the first and second storage blocks may correspond to different virtual machines running on the same hypervisor.

At block 304, the processing device may cause the first storage block and the second storage block to be decrypted and further encrypted using a common cryptographic input (e.g., location independent cryptographic input). The common cryptographic input may be used to encrypt multiple storage blocks and therefor may not be specific to each individual storage block. In one example, the first and second storage blocks may correspond to the same virtual machine and the common cryptographic input may be a cryptographic bit sequence generated by the hypervisor in view of data associated with the virtual machine. The decryption and subsequent encryption (e.g., re-encryption) may be done using different keys. In one example, the processing device may decrypt the second storage block of data using a decryption key in view of a first cryptographic input that is based on a physical address of the second storage block. The processing device may then encrypt the second storage block using an encryption key based on a second cryptographic input, which includes or is based on the common cryptographic input. After determining the cipher text of the first storage block and the cipher text of the second storage block are the same the processing device may return the second storage block to its original encryption using an encryption key based on the first cryptographic input. In one example, the keys associated with the first and second cryptographic input may be accessible to a hardware device performing a cryptographic function but concealed (e.g., inaccessible, unavailable, hidden) from a kernel performing the data deduplication. In another example, the first cryptographic input and corresponding decryption key may be concealed from the kernel performing the data deduplication and the second cryptographic input may be accessible to the kernel. In either example, the kernel may be a portion of a host operating system, a hypervisor, a guest operating system, or a combination thereof.

At block 306, the processing device may determine that a cipher text of the first storage block and a cipher text of the second storage block are the same. The determination may be based on one or more comparisons and the comparisons may be performed with access to only the encrypted content (cipher text, digest) without access to the unencrypted content (e.g., plain text, message). In one example, the processing device may directly compare the cipher text of a storage block with the cipher text of one or more other storage blocks. In another example, the processing device may indirectly compare multiple storage blocks by comparing data representative of cipher text such as a hash of the cipher text or of another portion of the storage blocks.

At block 308, the processing device may update a reference to the first storage block to reference the second storage block in response to the determining that the cipher text of the first storage block and the cipher text of the second storage block are the same. In one example, the first storage block and the second storage block may be duplicate memory pages and updating the reference may remove one of the duplicate memory pages. Updating of the reference may involve updating a page table entry (PTE) and invalidating the corresponding entry within a translation lookaside buffer (TLB). The page table entry may correspond to the first storage block and after the update may include a pointer to the physical address of the second storage block instead of the physical address of the first storage block. Updating the reference may also involve invalidating page table entries that correspond to the first storage block and the second storage block and flushing the translation lookaside buffer. Responsive to completing the operations described herein above with references to block 308, the method may terminate.

Referring to FIG. 4, method 400 may be performed to reduplicate date that was previously consolidated by the data deduplication process of method 300 or other storage consolidation technique. Method 400 may be performed by processing devices of a server device or a client device and may begin at block 402.

At block 402, the processing device may receive a request to modify a storage block comprising data encrypted using a location dependent cryptographic input. Location dependent cryptographic input may include a cryptographic bit sequence that is associated with or based on a location of the data and/or storage block. The location of the data may be based on hardware embedded information of a storage device, a processing device, a machine (e.g., physical or virtual machine), other information associated with a storage block, or a combination thereof. In one example, location dependent cryptographic input may be based on location information (e.g., spatial data) that corresponds to the storage block. The location information may be relative to a particular storage device, such as a physical address, a logical address, other address, or a combination thereof. In other examples, location dependent cryptographic input may also or alternatively be based on other location information such as information of the storage device containing the storage block or information about a processing device, interface, port, adapter, or other device for accessing the storage block.

At block 404, the processing device may cause data of the storage block to be encrypted using a location independent cryptographic input. The location independent cryptographic input may be a cryptographic key that is based on a cryptographic bit sequence provided by a hypervisor. The cryptographic bit sequence provided by the hypervisor may be generated by the hypervisor in view of data associated with a particular virtual machine. The location independent cryptographic input and the location dependent cryptographic input may both be accessible to a hardware device performing a cryptographic function but may be concealed from a kernel copying the encrypted data. The kernel may be a portion of at least one of a host operating system, a hypervisor, or a guest operating system, or other executable code performing storage management functions. In one example, causing the data of the storage block to be encrypted using the location independent cryptographic input may involve the hypervisor instructing a hardware device to decrypt the data at the first storage location using a location dependent cryptographic input and to encrypt the data at the first storage location using the location independent cryptographic input. The hardware device may be a processor executing the hypervisor, a memory controller, a disk controller, a graphics controller, other computing device, or a combination thereof.

At block 406, the processing device may copy the data encrypted using the location independent cryptographic input from a first storage location to a second storage location. The data at the first storage location may be non-modifiable data and the data at the second storage location may be modifiable data. The data at the first storage location and the data at the second storage location may be accessible to a virtual machine in an unencrypted form without being accessible to a hypervisor in an unencrypted form. In one example, the storage block may include a memory page and the first storage location may be a first memory page and the second storage location may be a second memory page. The first memory page and second memory page may be assigned to different virtual machines or to the same virtual machine. Each of the storage locations may be encrypted using respective location dependent cryptographic inputs that are based on a hardware feature of the respective memory page. In one example, the hardware feature may be based on a physical address of a respective storage location (e.g., memory page).

At block 408, the processing device may cause data at the second location (e.g., copied data) to be encrypted using a location dependent cryptographic input corresponding to the second storage location. Causing the data of the storage block to be encrypted may involve the hypervisor instructing the hardware device to decrypt the data that was previously encrypted using location independent cryptographic input and to subsequently encrypt the data at the second storage location using location dependent cryptographic input corresponding to the new storage location. In one example, causing the data of the storage block at either the first or second storage location to be encrypted using a location dependent or independent cryptographic input may involve the use of an in-place cryptographic function. The in-place cryptographic function may avoid copying the data of the storage block to location separate from the storage block during decryption and during encryption of the storage block.

At block 410, the processing device may update a reference of the storage block from the first storage location to the second storage location. As discussed above, the references of multiple storage blocks may all point to a single read-only storage block after deduplication is performed. As such, updating a reference of the storage block may involve updating one of a plurality of references that indicate (e.g., point to) the first storage location. The updated reference may be changed from pointing to the first storage location to pointing to the second storage location. Updating the reference may involve updating a page table entry and invalidating a corresponding entry within a translation lookaside buffer and may or may not include subsequently flushing the translation lookaside buffer. Responsive to completing the operations described herein above with references to block 410, the method may terminate.

Figure 5:
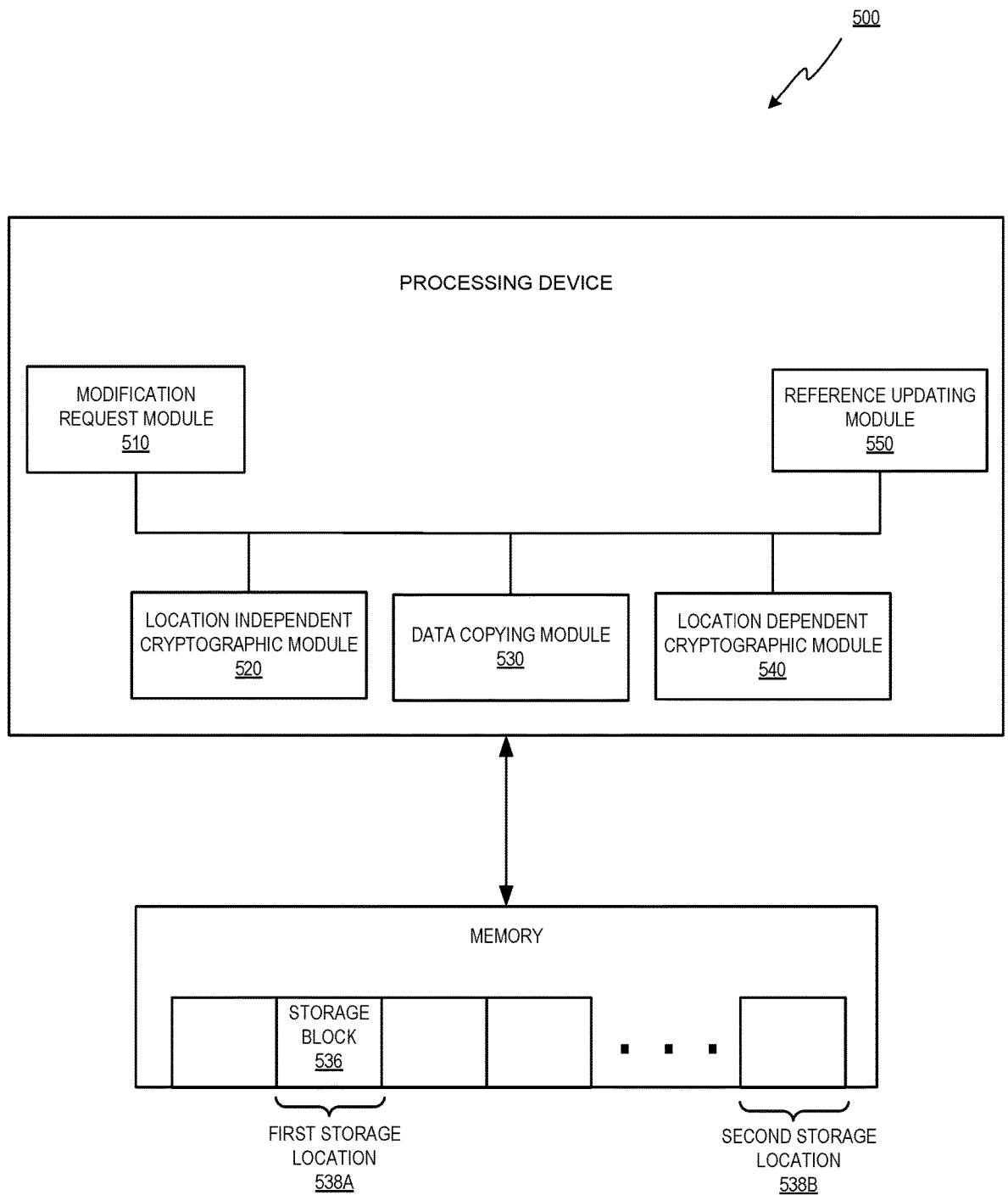
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 100 and may include one or more processing devices and one or more memory devices. In the example shown, computer system 500 may include a modification request module 510, a location independent cryptographic module 520, a data copying module 530, a location dependent cryptographic module 540, and a reference updating module 550.

Modification request module 510 may enable the processing device to receive a request to modify a storage block comprising data encrypted using a location dependent cryptographic input. Location dependent cryptographic input may include a cryptographic bit sequence that is associated with or based on a location of the data and/or storage block. The location of the data may be based on hardware embedded information of a storage device, a processing device, a machine (e.g., physical or virtual machine), other information associated with a storage block, or a combination thereof. In one example, location dependent cryptographic input may be based on location information (e.g., spatial data) that corresponds to a first location 538A of storage block 536. The location information may be relative to a particular storage device, such as a physical address, a logical address, other address, or a combination thereof. In other examples, location dependent cryptographic input may also or alternatively be based on other location information such as information of the storage device containing storage block 536 or information about a processing device, interface, port, adapter, or other device for accessing storage block 536.

Location independent cryptographic module 520 may instruct the processing device to cause data of storage block 536 to be encrypted using a location independent cryptographic input. The location independent cryptographic input may be a cryptographic key that is based on a cryptographic bit sequence provided by a hypervisor. The cryptographic bit sequence provided by the hypervisor may be generated by the hypervisor in view of data associated with a particular virtual machine. The location independent cryptographic input and the location dependent cryptographic input may both be accessible to a hardware device performing a cryptographic function but may be concealed from a kernel copying the encrypted data. The kernel may be a portion of at least one of a host operating system, a hypervisor, or a guest operating system, or other executable code performing storage management functions. In one example, causing the data of storage block 536 to be encrypted using the location independent cryptographic input may involve the hypervisor instructing a hardware device to decrypt the data at a first storage location 538A using a location dependent cryptographic input and to encrypt the data at the first storage location 538A using the location independent cryptographic input. The hardware device may be a processor executing the hypervisor, a memory controller, a disk controller, a graphics controller, other computing device, or a combination thereof.

Data copying module 530 may instruct the processing device to copy the data encrypted using the location independent cryptographic input from first storage location 538A to a second storage location 538B. The data at first storage location 538A may be non-modifiable data and the data at the second storage location 538B may be modifiable data. The data at first storage location 538A and the data at second storage location 538B may be accessible to a virtual machine in an unencrypted form without being accessible to a hypervisor in an unencrypted form. In one example, storage block 536 may include a memory page and first storage location 538A may be a first memory page and the second storage location 538B may be a second memory page. The first memory page and second memory page may be assigned to different virtual machines or to the same virtual machine. Each of the storage locations 538A, 538B may be encrypted using respective location dependent cryptographic inputs that are based on a hardware feature of the respective memory page. In one example, the hardware feature may be based on a physical address of a respective storage location (e.g., memory page).

Location dependent cryptographic module 540 may instruct the processing device to cause data at the second storage location 538A (e.g., copied data) to be encrypted using a location dependent cryptographic input corresponding to the second storage location 538B. Causing the data of storage block 536 to be encrypted may involve the hypervisor instructing the hardware device to decrypt the data that was previously encrypted using location independent cryptographic input and to subsequently encrypt the data at the second storage location 538B using location dependent cryptographic input corresponding to the new storage location. In one example, causing the data of storage block 536 at either the first storage location 538A or second storage location 538B to be encrypted using a location dependent or independent cryptographic input may involve the use of an in-place cryptographic function. The in-place cryptographic function may avoid copying the data of storage block 536 to location separate from storage block 536 during decryption and during encryption of storage block 536.

Reference updating module 550 may instruct the processing device to update a reference of storage block 536 from the first storage location 538A to the second storage location 538B. As discussed above, the references of multiple storage blocks may all point to a single read-only storage block after deduplication is performed. As such, updating a reference of storage block 536 may involve updating one of a plurality of references that indicate (e.g., point to) first storage location 538A. The updated reference may be changed from pointing to first storage location 538A to pointing to second storage location 538B. Updating the reference may involve updating a page table entry and invalidating a corresponding entry within a translation lookaside buffer and may or may not include subsequently flushing the translation lookaside buffer.

Figure 6:
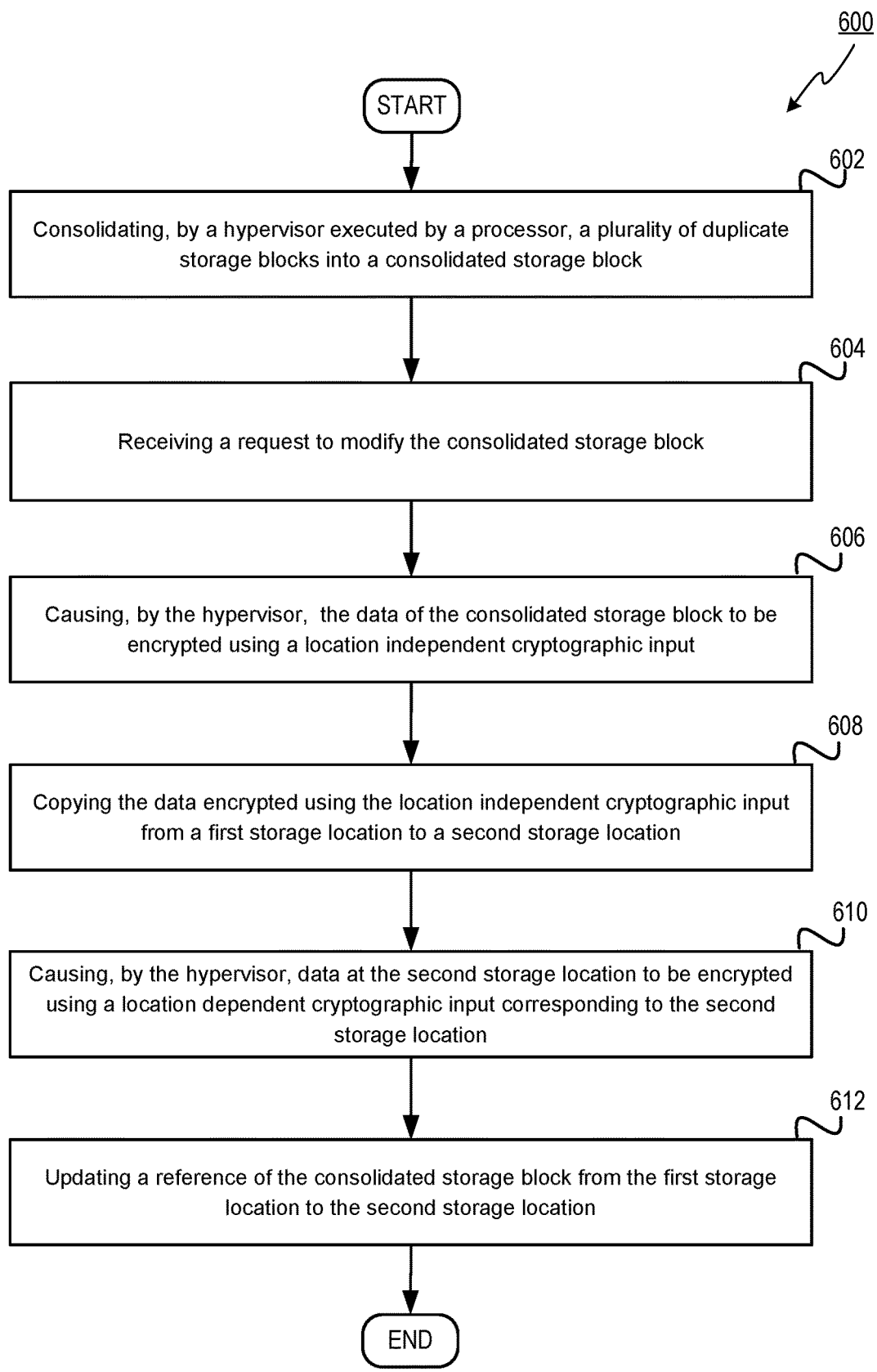
FIG. 6 depicts a flow diagram of an example method of data reduplication performed by a hypervisor on encrypted memory blocks assigned to a virtual machine, in accordance with one or more aspects of the present disclosure.

FIG. 6 depicts a flow diagram of an illustrative example of a method 600 for performing data reduplication of a storage device while the data on the storage device is encrypted with location dependent encryption, in accordance with one or more aspects of the present disclosure. Method 600 may be similar to method 400 and may be performed in the same or a similar manner as described above in regards to FIG. 4. Method 600 may be performed by processing devices of a server device or a client device and may begin at block 602.

At block 602, the processing device executing a hypervisor may consolidate a plurality of duplicate storage blocks into a storage block. The consolidation of the plurality of duplicate storage block may be performed using some or all of the data duplication discussed in regards to method 300. The storage block may include read-only data that is encrypted using a location dependent cryptographic input. The location dependent cryptographic input may include a cryptographic bit sequence that is associated with or based on a location of the data and/or storage block. The location of the data may be based on hardware embedded information of a storage device, a processing device, a machine (e.g., physical or virtual machine), other information associated with a storage block, or a combination thereof.

At block 604, the processing device may receive a request to modify a storage block. The request may include storage block identification data, modification data, other data, or a combination thereof. The storage block identification data may be used to determine one or more storage blocks and may include one or more references or storage locations. The modification data may identify an operation or instruction for modifying the data in some manner. The request may be received by a kernel (e.g., hypervisor) from upper-level executable code (e.g., virtual machine). In one example, the hypervisor may receive the request from a guest operating system kernel or guest application executing on the virtual machine.

At block 606, the processing device executing the hypervisor may cause data of the storage block to be encrypted using a location independent cryptographic input. The location independent cryptographic input may be a cryptographic key that is based on a cryptographic bit sequence provided by the hypervisor. The cryptographic bit sequence provided by the hypervisor may be generated by the hypervisor in view of data associated with a particular virtual machine. The location independent cryptographic input and the location dependent cryptographic input may both be accessible to a hardware device performing a cryptographic function but may be concealed from a kernel copying the encrypted data. The kernel may be a portion of at least one of a host operating system, a hypervisor, or a guest operating system, or other executable code performing storage management functions. In one example, causing the data of the storage block to be encrypted using the location independent cryptographic input may involve a hypervisor instructing a hardware device to decrypt the data at the first storage location using a location dependent cryptographic input and to encrypt the data at the first storage location using the location independent cryptographic input. The hardware device may be a processor executing the hypervisor, a memory controller, a disk controller, other computing device, or a combination thereof.

At block 608, the processing device may copy the data encrypted using the location independent cryptographic input from a first storage location to a second storage location. The data at the first storage location may be non-modifiable data and the data at the second storage location may be modifiable data. The data at the first storage location and the data at the second storage location may be accessible to a virtual machine in an unencrypted form without being accessible to a hypervisor in an unencrypted form. In one example, the storage block may include a memory page and the first storage location may be a first memory page and the second storage location may be a second memory page. The first memory page and second memory page may be assigned to different virtual machines or to the same virtual machines. Each of the storage location may be encrypted using respective location dependent cryptographic inputs that are based on a hardware feature of the respective memory page. In one example, the hardware feature may be based on a physical address of a respective storage location (e.g., memory page).

At block 610, the processing device executing the hypervisor may cause data at the second location (e.g., copied data) to be encrypted using a location dependent cryptographic input corresponding to the second storage location. Causing the data of the storage block to be encrypted may involve the hypervisor instructing the hardware device to decrypt the data that was previously encrypted using location independent cryptographic input and to subsequently encrypt the data at the second storage location using location dependent cryptographic input corresponding to the new storage location. In one example, causing the data of the storage block at the first or second storage location to be encrypted using a location dependent or independent cryptographic input may involve the use of an in-place cryptographic function. The in-place cryptographic function may avoid copying the data of the storage block to location separate from the storage block during decryption and during encryption of the storage block.

At block 612, the processing device may update a reference of the storage block from the first storage location to the second storage location. As discussed above, the references of multiple storage blocks may all point to a single read-only storage block after deduplication is performed. As such, updating a reference of the storage block may involve updating one of a plurality of references that indicate (e.g., point to) the first storage location. The updated reference may be changed from pointing to the first storage location to pointing to the second storage location. Updating the reference may involve updating a page table entry and invalidating a corresponding entry within a translation lookaside buffer and may or may not include subsequently flushing the translation lookaside buffer. Responsive to completing the operations described herein above with references to block 612, the method may terminate.

Figure 7:
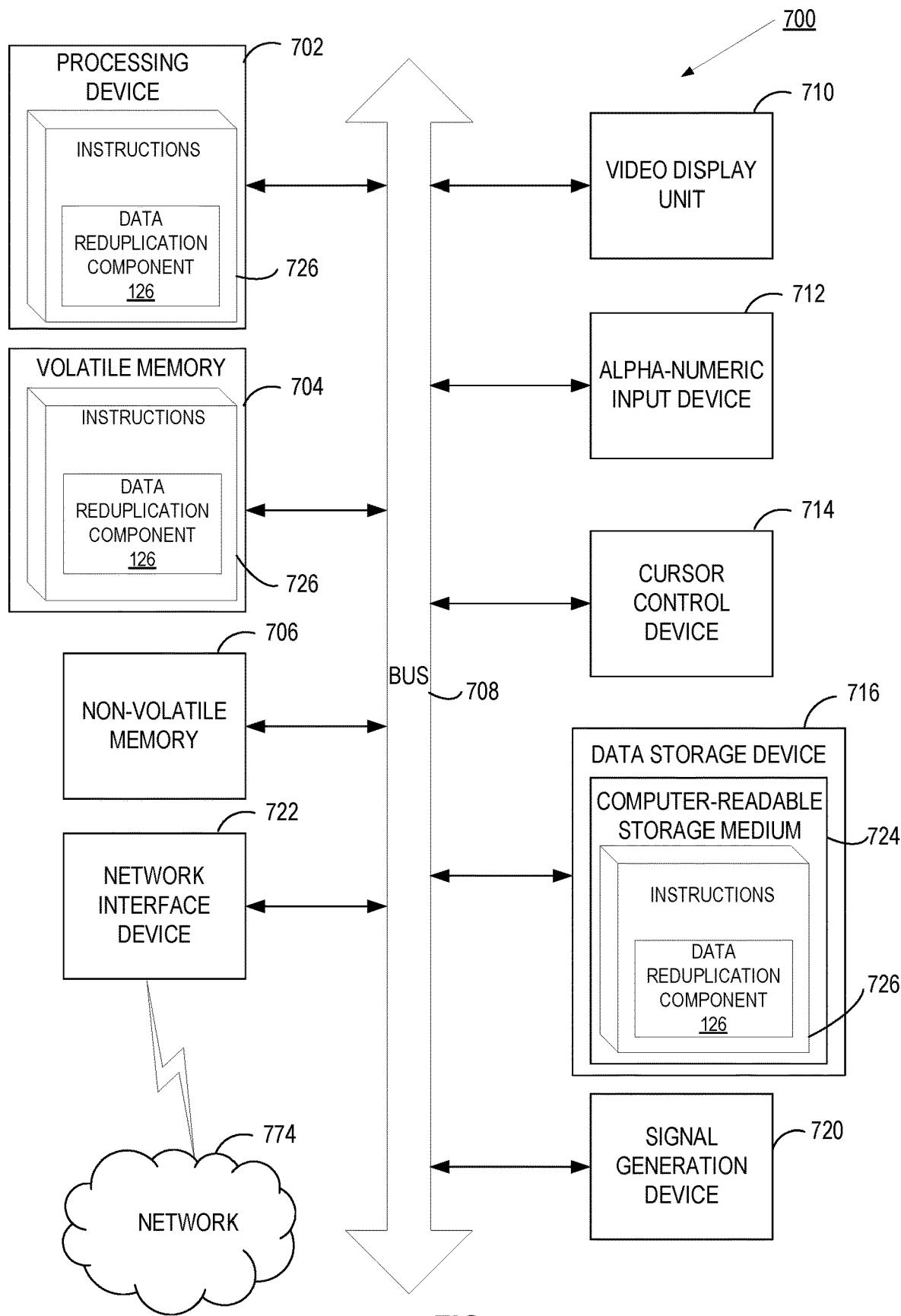
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 400 and for encoding data reduplication component 126 of FIGS. 1 and 2.

Instructions 726 may also reside, completely or partially, within volatile memory 704 and/or within processing device 702 during execution thereof by computer system 700, hence, volatile memory 704, and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a request to modify a memory page of a plurality of memory pages, wherein the plurality of memory pages are duplicate memory pages that each comprise a reference to a first storage location in physical memory and wherein the first storage location comprises data encrypted using a location dependent cryptographic input;
   causing, by a hypervisor executed by the processing device, the data at the first storage location to be decrypted using the location dependent cryptographic input and then encrypted using a location independent cryptographic input to produce encrypted data, wherein the location independent cryptographic input is based on a cryptographic bit sequence that is provided by the hypervisor and is associated with a virtual machine;
   copying, by the hypervisor, the encrypted data of the memory page that is encrypted using the location independent cryptographic input from the first storage location to a second storage location, wherein the first storage location and the second storage location are different storage locations in the physical memory;
   causing, by the hypervisor, the encrypted data at the first storage location and the encrypted data at the second storage location to be decrypted using location independent cryptographic input and to each be encrypted using a different location dependent cryptographic input;
   updating, by the hypervisor, one of the references of the plurality of memory pages from pointing to the first storage location in the physical memory to pointing to the second storage location in the physical memory; and modifying the memory page by altering data in the physical memory.

2. The method of claim 1, wherein the encrypted data at the first storage location comprises non-modifiable data and the encrypted data at the second storage location comprises modifiable data.

3. The method of claim 1, wherein the location independent cryptographic input and the location dependent cryptographic inputs are accessible to a hardware device performing a cryptographic function and are concealed from the hypervisor that is copying the encrypted data, wherein the hypervisor is a portion of a host operating system or a guest operating system.

4. The method of claim 1, wherein the encrypted data at the first storage location and the encrypted data at the second storage location are accessible to the virtual machine in an unencrypted form without being accessible to the hypervisor in an unencrypted form.

5. The method of claim 1, wherein the first storage location comprises encrypted data of a first memory page and the second storage location comprises encrypted data of a second memory page, and wherein the first memory page and second memory page are assigned to different virtual machines.

6. The method of claim 5, wherein the second storage location comprises data that is encrypted using a location dependent cryptographic input that corresponds to the second storage location and is based on a hardware feature of a device storing the second memory page, wherein the hardware feature comprises a physical address for the second storage location.

7. The method of claim 1, wherein the location independent cryptographic input comprises a cryptographic key generated using the cryptographic bit sequence provided by the hypervisor.

8. The method of claim 1, wherein the cryptographic bit sequence provided by the hypervisor is generated by the hypervisor in view of data that is associated with the virtual machine.

9. The method of claim 1, wherein causing the data to be encrypted using the location independent cryptographic input comprises:

instructing, by the hypervisor, a hardware device to encrypt the data at the first storage location using the location independent cryptographic input.

10. The method of claim 1, wherein causing the data to be decrypted and then encrypted comprises use of an in-place cryptographic function that avoids copying the data in the physical memory to another location in the physical memory during the decryption and during the encryption of the data of the memory page.

11. The method of claim 1, wherein updating one of the references comprises:

updating a page table entry;
invalidating a corresponding entry within a translation lookaside buffer; and
flushing the translation lookaside buffer.

12. A system comprising:

a memory;
a processing device operatively coupled to the memory, the processing device to:
receive a request to modify a memory page of a plurality of memory pages, wherein the plurality of memory pages are duplicate memory pages that each comprise a reference to a first storage location in physical memory and wherein the first storage location comprises data encrypted using a location dependent cryptographic input;

cause, by a hypervisor, the data at the first storage location to be decrypted using the location dependent cryptographic input and then encrypted using a location independent cryptographic input to produce encrypted data wherein the location independent cryptographic input is based on a cryptographic bit sequence that is provided by the hypervisor and is associated with a virtual machine;

copy, by the hypervisor, the encrypted data of the memory page that is encrypted using the location independent cryptographic input from the first storage location to a second storage location, wherein the first storage location and the second storage location are different storage locations in the physical memory;

cause, by the hypervisor, the encrypted data at the first storage location and the encrypted data at the second storage location to be decrypted using location independent cryptographic input and to each be encrypted using a different location dependent cryptographic input; and update one of the references of the plurality of memory pages from pointing to the first storage location in the physical memory to pointing to the second storage location in the physical memory.

13. The system of claim 12, wherein the encrypted data at the first storage location comprises non-modifiable data and the encrypted data at the second storage location comprises modifiable data.

14. The system of claim 12, wherein the location independent cryptographic input and the location dependent cryptographic inputs are accessible to a hardware device performing a cryptographic function and are concealed from the hypervisor that is copying the encrypted data, wherein the hypervisor is a portion of a host operating system or a guest operating system.

15. The system of claim 12, wherein the encrypted data at the first storage location and the encrypted data at the second storage location are accessible to the virtual machine in an unencrypted form without being accessible to the hypervisor in an unencrypted form.

16. A non-transitory machine-readable storage medium storing instructions that cause a processing device to:

consolidate, by a hypervisor executed by the processing device, a plurality of memory pages into a consolidated storage block in physical memory, wherein the plurality of memory pages are duplicate memory pages that each comprise a reference to the consolidated storage block at a first storage location in physical memory and wherein the first storage location comprises data encrypted using a location dependent cryptographic input;

receive a request to modify a memory page of the plurality of memory pages;

cause, by the hypervisor, the data of the consolidated storage block to be decrypted using the location dependent cryptographic input and then encrypted using a location independent cryptographic input to produce encrypted data, wherein the location independent cryptographic input is based on a cryptographic bit sequence that is provided by the hypervisor and is associated with a virtual machine;

copy, by the hypervisor, the encrypted data of the memory page that is encrypted using the location independent cryptographic input from the first storage location to a second storage location in the physical memory;

cause, by the hypervisor, the encrypted data at the first storage location and the encrypted data at the second storage location to be decrypted using location independent cryptographic input and to each be encrypted using a different location dependent cryptographic input; and update one of the references of the plurality of memory pages from pointing to the first storage location in the physical memory to pointing to the second storage location in the physical memory.

17. The non-transitory machine-readable storage medium of claim 16, wherein the encrypted data at the first storage location comprises non-modifiable data and the encrypted data at the second storage location comprises modifiable data.

18. The non-transitory machine-readable storage medium of claim 16, wherein the location independent cryptographic input and the location dependent cryptographic inputs are accessible to a hardware device performing a cryptographic function and are concealed from the hypervisor.

19. The non-transitory machine-readable storage medium of claim 16, wherein the encrypted data at the first storage location and the encrypted data at the second storage location are accessible to the virtual machine in an unencrypted form without being accessible to the hypervisor in an unencrypted form.

20. The non-transitory machine-readable storage medium of claim 16, wherein the first storage location comprises encrypted data of a first memory page and the second storage location comprises encrypted data of a second memory page, and wherein the first memory page and second memory page are assigned to different virtual machines.

* * * * *